J. J. GOKEY.
SEEDER ATTACHMENT FOR CULTIVATORS.
APPLICATION FILED MAY 8, 1915.

1,178,311.

Patented Apr. 4, 1916.
2 SHEETS—SHEET 1.

Witnesses
Fenton N Belt
J. W. Sherwood

Inventor
J. J. Gokey
Franklin N. Hough
By
Attorney

J. J. GOKEY.
SEEDER ATTACHMENT FOR CULTIVATORS.
APPLICATION FILED MAY 8, 1915.

1,178,311.

Patented Apr. 4, 1916.
2 SHEETS—SHEET 2.

Witnesses
Fenton S Belt
J. W. Sherwood

Inventor
J. J. Gokey
By Franklin N Hough
Attorney

UNITED STATES PATENT OFFICE.

JOSEPH JOHN GOKEY, OF DAWSON, NORTH DAKOTA.

SEEDER ATTACHMENT FOR CULTIVATORS.

1,178,311.   Specification of Letters Patent.   Patented Apr. 4, 1916.

Application filed May 8, 1915. Serial No. 26,805.

*To all whom it may concern:*

Be it known that I, JOSEPH JOHN GOKEY, a citizen of the United States, residing at Dawson, in the county of Kidder and State of North Dakota, have invented certain new and useful Improvements in Seeder Attachments for Cultivators; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in seeder attachments for cultivators, especially adapted for planting potatoes, etc., and consists of a simple and efficient device of this nature having various details of construction, combinations and arrangements of parts which will be hereinafter fully described, shown in the accompanying drawings and then specifically defined in the appended claim.

Figure 1:
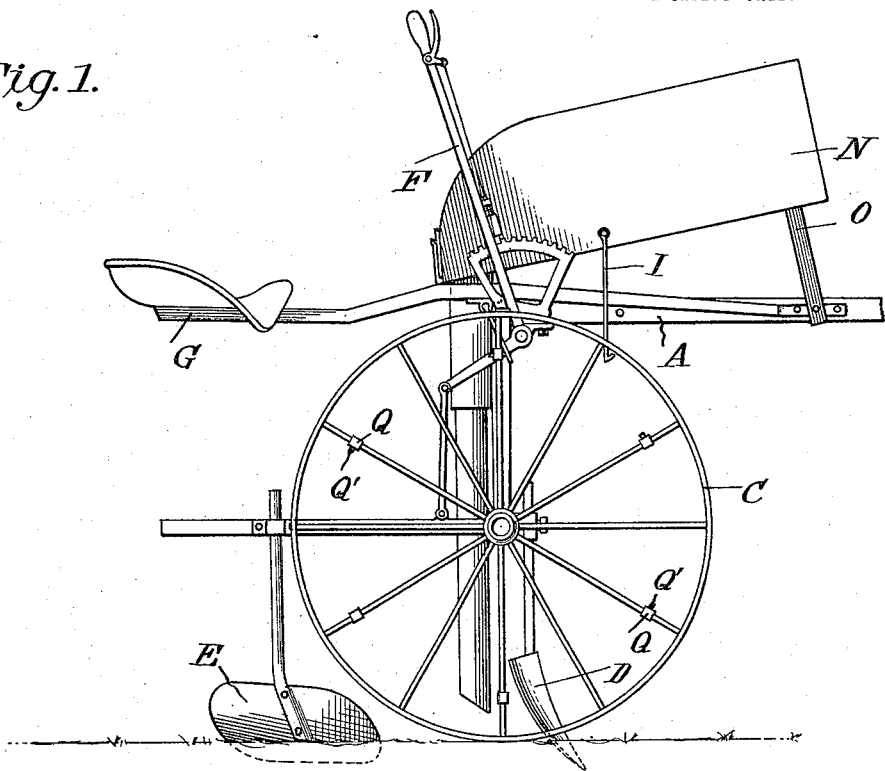
Figure 2:
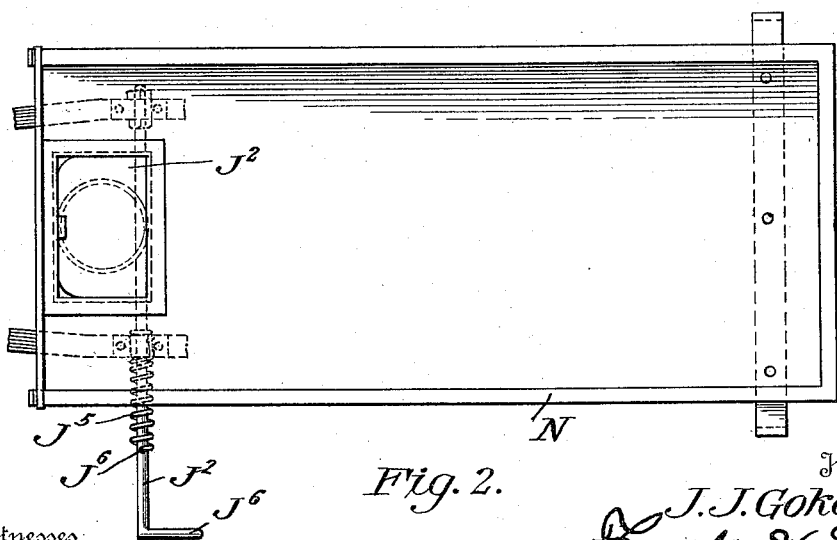
Figure 3:
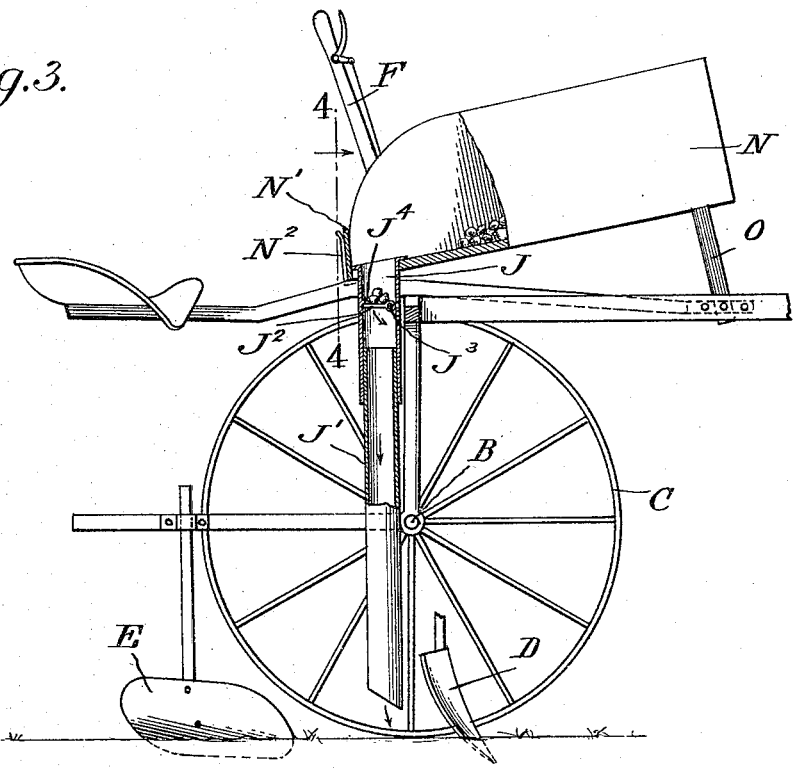
Figure 4:
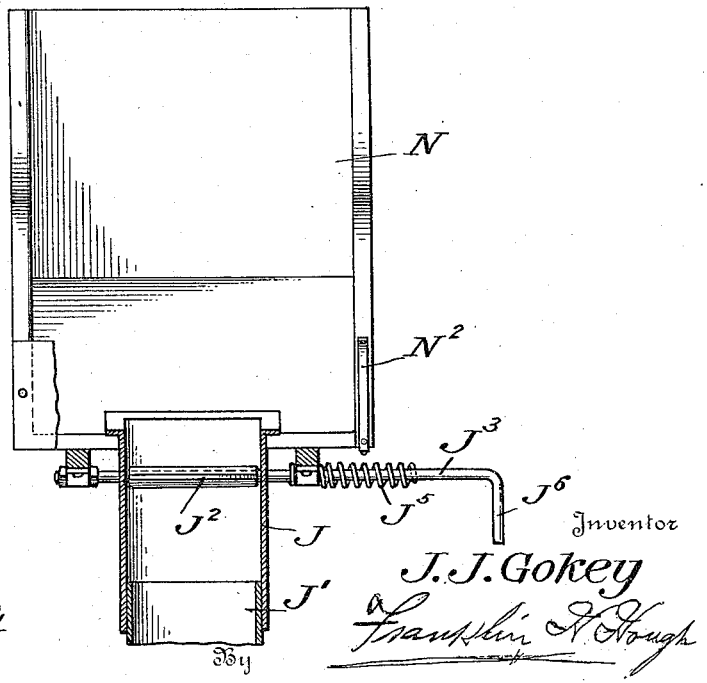

My invention is illustrated in the accompanying drawings, in which:

Figure 1 is a side elevation of the apparatus as applied to a cultivator. Fig. 2 is a top plan view. Fig. 3 is a vertical sectional view, partially in elevation, and Fig. 4 is a sectional view on line 4—4 of Fig. 3, looking in the direction of the arrow.

Reference now being had to the details of the drawings by letter, A designates the frame of an ordinary cultivator, having an axle B on which the wheels C are mounted. Said cultivator has the furrow-making mold board D and a suitable covering plow E, and the lever F, having pivotal connection with the frame carrying the covering shovel, serving as means for raising and lowering the same.

G designates a seat fastened to the projecting portion of the frame. A hopper N is held upon the frame, being supported at one end by a brace O, and has pivotally connected to its side a hook I. The gate N' is held to the open end of the hopper by means of the resilient arms $N^2$, and the bottom of the hopper is apertured for the reception of the exit pipe J. A pipe J' telescopes within the pipe J and a gate or damper, designated by letter $J^2$, is fixed to a rock shaft $J^3$, a detail of which is shown in Figs. 2 and 4 of the drawings. A rib $J^4$ projects from the inner surface of the pipe J and serves as a stop to limit the upper movement of the gate or damper. A spring $J^5$ is fastened at one end in a hole to the rock shaft $J^2$ and its other end is held stationary, as shown in Fig. 2 of the drawings, the purpose of said spring being to normally hold the gate closed. The outer end of the gate is bent at an angle as at $J^6$ and projects in the path of the lugs of the collars Q, so that, as one spoke passes by the angled end $J^6$, it will contact therewith and give a rocking movement to the shaft which will allow the seed to fall into the ground in the furrow which has been formed by the plow D and which seed and furrow is closed by the covering scraper E. The spokes of the wheel, it will be noted, have collars Q held thereon by means of adjusting nuts Q' and the lugs project laterally from the spokes and act as tappets.

What I claim to be new is:—

A seeder attachment for cultivators comprising, in combination with a cultivator frame and wheels upon which the same is mounted, a seed receptacle upon the frame and having an exit pipe leading therefrom, a rock shaft, bearings upon the frame in which said shaft is journaled, said shaft passing through said pipe, a damper within the latter and fixed to said shaft, said shaft having an angled end, a coiled spring fastened at one end to the shaft and the other end to the hopper, collars upon the spokes of said wheel, adjusting screws upon said collars, and each collar having a projection disposed in the path of the angled end of said shaft.

In testimony whereof I hereunto affix my signature in presence of two witnesses.

JOSEPH JOHN GOKEY.

Witnesses:
C. A. CROSS,
W. B. ROWLAND.

Copies of this patent may be obtained for five cents each, by addressing the "Commissioner of Patents, Washington, D. C."